United States Patent [19]
Anderson

[11] 3,744,312
[45] July 10, 1973

[54] NAVIGATION APPARATUS

[75] Inventor: Edward William Anderson, Cheltenham, England

[73] Assignee: Smiths Industries Limited, London, England

[22] Filed: June 2, 1971

[21] Appl. No.: 149,168

[52] U.S. Cl. .................. 73/178, 33/356, 33/361
[51] Int. Cl. ................ G01c 21/08, G01c 23/00
[58] Field of Search ............... 33/356, 361; 73/178

[56] References Cited
UNITED STATES PATENTS

| | | | |
|---|---|---|---|
| 2,692,970 | 10/1954 | Tolles | 33/356 X |
| 2,998,727 | 9/1961 | Baker | 33/361 X |
| 3,253,342 | 5/1966 | Depp | 33/361 X |
| 3,541,853 | 11/1970 | Anderson | 73/178 R |

Primary Examiner—Robert B. Hull
Attorney—William D. Hall, Elliott I. Pollock, Fred C. Philpitt, George Vande Sande, Charles F. Steininger and Robert R. Priddy

[57] ABSTRACT

Navigation apparatus for a military tank includes three flux-valve detector-pairs that each sense fore-aft and athwartships components of the earth's magnetic field at different distances from the craft along a non-ferromagnetic boom. Fractionally-weighted values of the components sensed by the detector-pair nearest the tank are subtracted from their corresponding component-values sensed by the detector-pair furthest from the tank. To the results of the subtractions there are added fractionally-weighted values of the components sensed by the intermediately-located detector-pair so as thereby to derive component-values corrected for the craft-produced magnetic-deviation and also for changes in location of the effective magnetic-center of the tank arising from changes in orientation of the tank's gun. These values, before they are used to indicate tank-heading and compute northing and easting of the craft, are corrected for local magnetic-variation by combining with a fraction of each, a preselected fraction of the other.

14 Claims, 4 Drawing Figures

Patented July 10, 1973 3,744,312

Edward William Anderson
Inventor

George Vande Sande
Attorney

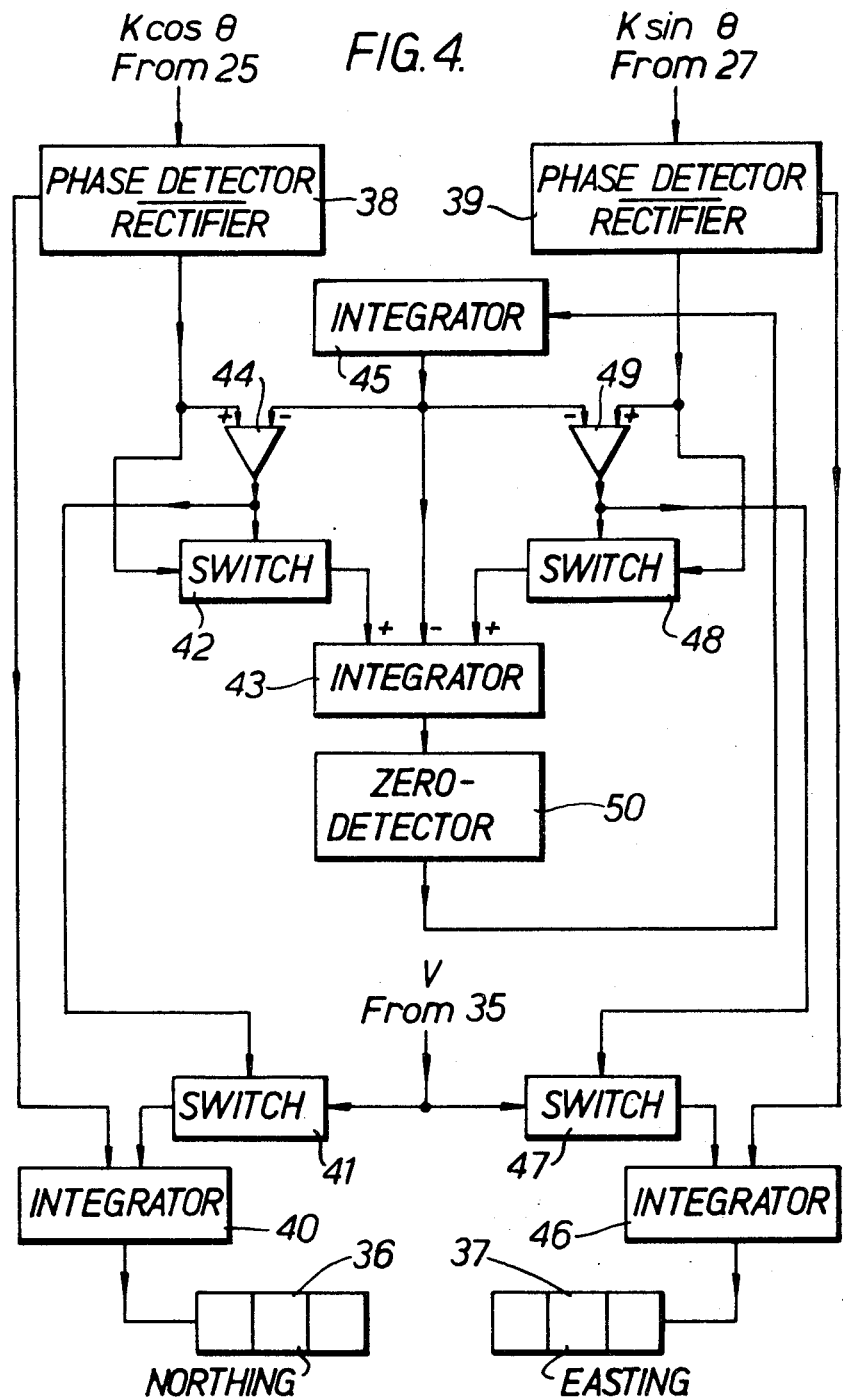

NAVIGATION APPARATUS

BACKGROUND OF THE INVENTION

This invention relates to navigation apparatus.

The invention is particularly concerned with apparatus of the kind for use in the navigation of a craft (which may be a land-, air-, or sea-craft) by reference to the earth's magnetic field, and in which compensation is made for the local distortion of the field caused by the presence of the craft.

Navigation apparatus of this kind is described in my U.S. Pat. No. 3,541,853, issued Nov. 24, 1970. In this earlier apparatus two magnetic detector devices each comprising two mutually-perpendicular flux valves are carried spaced from one another along the length of a non-magnetic boom mounted on the craft. The detector devices provide a first pair of signals that are dependent on the magnitudes at spaced locations of the earth's magnetic field acting parallel to the fore-aft axis of the craft, and a corresponding, second pair of signals in respect of the athwartships axis. The two signals of each pair are compared with one another by subtraction in a respective one of two amplifiers, so as to produce from the two amplifiers output signals proportional to sine and cosine values for the craft's heading angle with respect to magnetic north. Compensation for craft-induced errors in the relative values of these sine and cosine values is achieved by fractionally-weighting the signals from one of the detector devices, in particular that nearest the craft, before they are passed to the amplifiers. To this end each of these signals is passed to its respective amplifier via a potentiometer that is adjusted during an initial setting-up procedure in accordance with the ratio of the magnetic-field component errors at the two detector locations on the boom.

The two amplifier output-signals are combined together in accordance with the craft heading related to true north. These signals are supplied to a resolver to produce a compass indication of craft heading, and are also used, together with a craft-speed signal, to compute indications of northing and easting of the craft. The computations of northing and easting may for example involve an integrating timing unit as described in my U.S. application Ser. No. 886,243, filed Dec. 18, 1969 (now U.S. Pat. No. 3,609,314, issued Sept. 28, 1971).

With the navigation apparatus of the above-mentioned U.S. Pat. No. 3,541,853, it is assumed that the effective magnetic-center of the craft always remains in the same, or substantially the same, position within the craft when the craft is in use. While this is true of most craft there are some craft in which the position of the effective magnetic-center within the craft will change considerably when the craft is in use and thereby result in large errors in navigation. This is particularly the case in, for example, military craft such as tanks where the position of the effective magnetic-center changes considerably when the gun is angularly displaced.

SUMMARY OF THE INVENTION

According to one aspect of the present invention there is provided apparatus for use in the navigation of a craft by reference to the earth's magnetic field, in which compensation for variation in the position of the effective magnetic-center of the craft is achieved by use of additionally-derived signals. In this respect the apparatus may involve three or more sets of magnetic detector-device means that are positioned to derive first signals in accordance respectively with the magnitudes at more than two spaced locations of the component of deviated field acting parallel to a first of two mutually-inclined craft-axes and to derive second signals in accordance respectively with the magnitudes at more than two spaced locations of the component of deviated field acting parallel to a second of the two craft-axes. A first comparison means is provided to respond to the set of first signals to provide an output representation in accordance with the component of undeviated field acting parallel to the first craft-axis, and second comparison means is provided to respond to the set of second signals to provide an output representation in accordance with the component of undeviated field acting parallel to the second craft-axis. The first and second comparison means both include means for modifying at least two of their respective set of signals to modify the ratio to one another of those signals, for example by fractional weighting, in accordance with components of the craft-induced magnetic deviation experienced at different ones of the three or more detector-device locations. The output signals of the comparison means are provided as dependent upon the differences between these ratio-modified signals to be effectively independent of variation of the craft magnetic-center.

Where three detector-device sets are used then the first and second signals supplied by two of these may be passed via potentiometers to be fractionally-weighted before they are applied to the comparison means for combination with the relevant signals provided by the third detector-device set. The potentiometers are adjusted in a setting-up procedure to produce weightings that are dependent upon the differences of craft-induced deviation at the different detector locations and also upon different possible-locations of its magnetic-center within the craft. In particular, with a tank, where the location of the effective magnetic-center depends on the orientation of the main gun, the setting up of one potentiometer is effected while the gun is in its usual fore-aft orientation and of the other while the gun is swung into a sideways-aimed orientation.

BRIEF DESCRIPTION OF THE DRAWINGS

Navigation apparatus in accordance with the present invention will now be described, by way of example, with reference to the accompanying drawings, in which:

FIG. 4 is a schematic representation of a computer used in the navigation apparatus.

DESCRIPTION OF THE PREFERRED EMBODIMENTS

Although the navigation apparatus in the present instance will be described when mounted on a tank the apparatus is equally applicable to other forms of land-craft and also to sea-craft and air-craft. The whole electrical circuit of the apparatus can readily be provided in compact and lightweight form using solid-state components and micro-miniaturization techniques.

Figure 1:
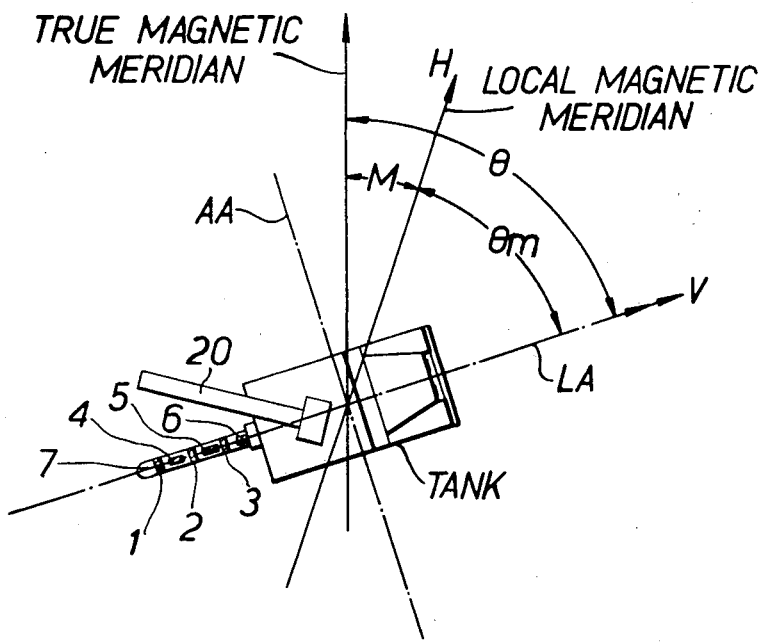
FIG. 1 is a diagrammatic plan view of a tank carrying the navigation apparatus.
Figure 2:
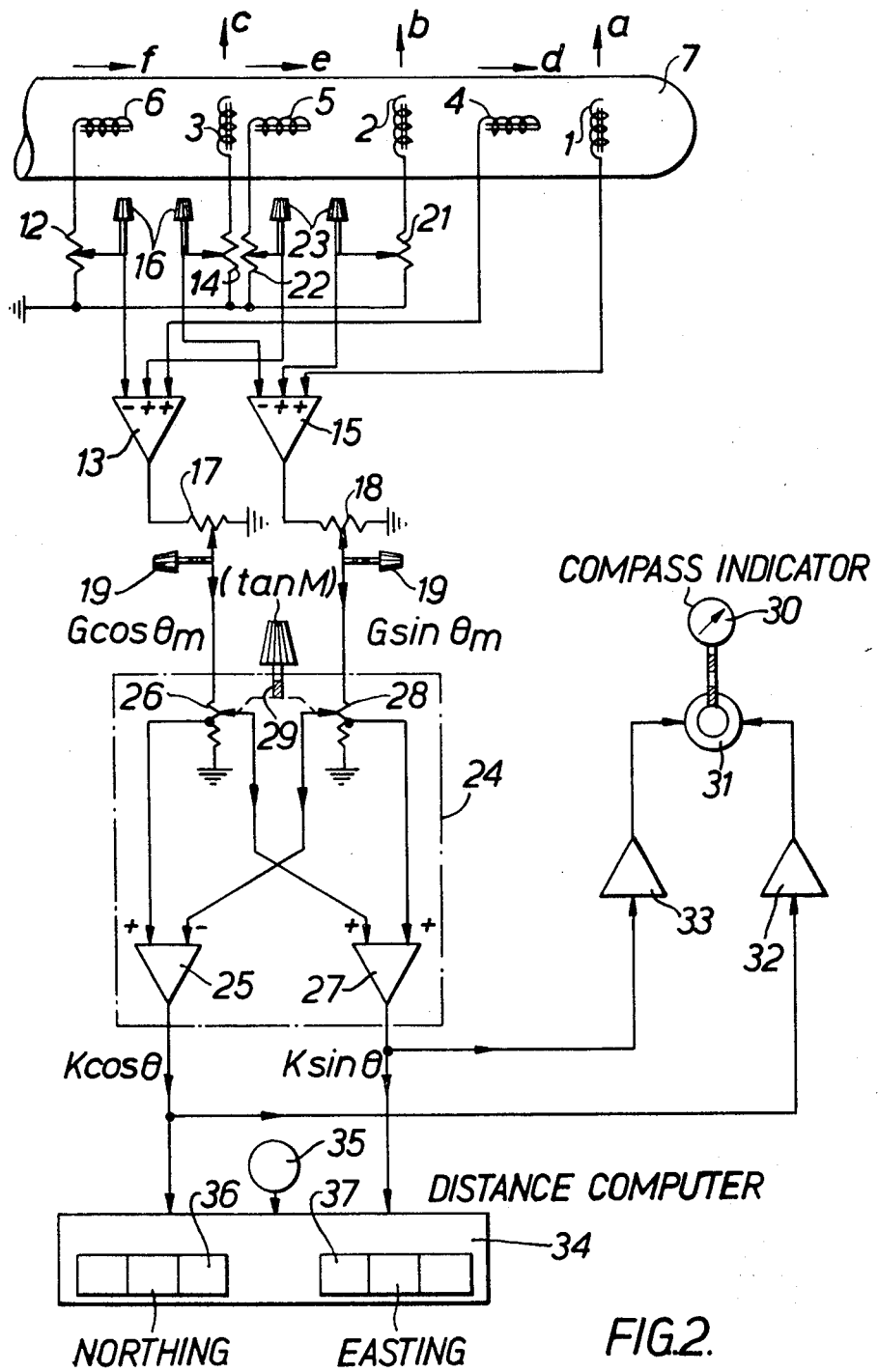
FIG. 2 is a schematic representation of the navigation apparatus.

Referring to FIGS. 1 and 2, six flux-valve devices 1 to 6 are pendulously mounted on a non-ferromagnetic boom 7 that projects from the tank by a short distance; the boom 7 may be, for example, of aluminum and project forwardly of the tank by a distance less than four feet. The flux-valve devices 1 to 6 are spaced apart along the boom 7, with the devices 1 and 6 mounted at the far and near ends respectively, and are arranged to sense magnetic-field strengths in mutually-perpendicular directions. To this end, the flux-valve devices 4 to 6 extend parallel to the longitudinal (fore-aft) axis LA of the tank, whereas the flux-valve devices 1 to 3 extend parallel to the transverse (athwartships) axis AA of the tank.

Figure 3:
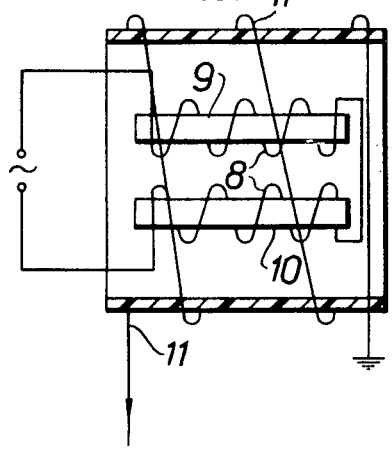
FIG. 3 shows the form of a magnetic flux-valve device used in the navigation apparatus.

The flux-valve devices 1 to 6 each have, as shown in FIG. 3, an electrical excitation winding 8 that is arranged to be supplied with alternating current and is wound to embrace individually two elongated ferromagnetic elements 9 and 10 of the device. The ferromagnetic elements 9 and 10 extend parallel to one another with the winding 8 wound to magnetise them in opposite senses and with an output electrical winding 11 embracing the two elements 9 and 10 conjointly. An electrical alternating current signal is induced in the output winding 11, this signal having an amplitude that provides a measure of the magnetic strength acting in the lengthwise direction of the elements 9 and 10. The devices 1 to 3 are mounted on the boom 7 with their elements 9 and 10 extending parallel to the transverse axis AA whereas the devices 4 to 6 are mounted on the boom 7 with their elements 9 and 10 extending parallel to the longitudinal axis LA. The output signals of the devices 1 to 3 and the devices 4 to 6 accordingly provide measures of the transverse and longitudinal components, respectively, of the local horizontal magnetic field in the vicinity of the tank.

The magnetic fields at the spaced positions of the devices 1 to 6 differ because of the differing distances of these positions from the tank. The signals supplied by the devices 1 to 6 are representative, respectively, of:

$H \sin \theta_m + a$ (1)
$H \sin \theta_m + b$ (2)
$H \sin \theta_m + c$ (3)
$H \cos \theta_m + d$ (4)
$H \cos \theta_m + e$ (5)
$H \cos \theta_m + f$ (6)

where:
 H is the local strength of the horizontal component of the earth's magnetic field alone;
 $\theta_m$ is the magnetic-heading of the vehicle (that is to say, the angle between the longitudinal axis LA of the tank and the local magnetic meridian);
 a, b and c are the strengths at the devices 1, 2 and 3, respectively, of the transverse components of the magnetic field due to the tank itself; and
 d, e and f are the strengths at the devices 4, 5 and 6, respectively, of the longitudinal components of the magnetic field due to the tank itself.

Referring more particularly to FIG. 2, the output signal of the device 6 is supplied via a potentiometer 12 to a differential amplifier 13 for subtraction from the output signal of the device 4. Similarly, the output signal of the device 3 is supplied via a potentiometer 14 to a differential amplifier 15 for subtraction from the output signal of the device 1. The potentiometers 12 and 14 are both set by manual controls 16 such as to reduce the output signals of the devices 6 and 3 respectively, the factor in the case of the potentiometer 12 being $(d/f)$, and in the case of the potentiometer 14 being $(a/c)$. The magnitude of any resultant difference-signal supplied by the amplifier 13 in response to the output signal of the device 4 and the ratio-modified output signal of the device 6 alone, is representative of:

$H(1 - d/f) \cos \theta_m$ (7)

Similarly the magnitude of any resultant difference-signal supplied by the amplifier 15 in response to the output signal of the device 1 and the ratio-modified output signal of the device 3 alone, is representative of:

$H(1 - a/c) \sin \theta_m$ (8)

The terms $(d/f)$ and $(a/c)$ are in general unequal, since the two devices 4 and 6, and the two devices 1 and 3, are disposed at different positions relative to the tank. Compensation for this is made by passing the difference-signals supplied by the amplifiers 13 and 15 through respective potentiometers 17 and 18. The potentiometers 17 and 18 are set by manual controls 19 such that the magnitude of the signal supplied by the amplifier 13 is multiplied by the factor $(1 - a/c)$ and the magnitude of the signal supplied by the amplifier 15 is multiplied by the factor $(1 - d/f)$. Thus with the output signals of the amplifiers 13 and 15 derived from the devices 4 and 6, and 1 and 3, alone, the output signals of the potentiometers 17 and 18 have magnitudes representative respectively of:

$G \cos \theta_m$ (9)
$G \sin \theta_m$ (10)

where G is equal to $H(1 - d/f)(1 - a/c)$

To the extent that the navigation apparatus has so far been described with reference to FIG. 2 as involving combination of signals from just two pairs of flux-valve devices, it is essentially the same as that disclosed in the above-mentioned U.S. Pat. No. 3,541,853. When this earlier apparatus is used with many forms of craft it is possible by suitable adjustment of the potentiometer controls 16 and 19 to eliminate to a substantial extent, as indicated by the expressions (9) and (10), any effects of craft-induced deviation in the ratio to one another of the derived field-component signals. However if the craft is a tank, having a gun 20 as shown in FIG. 1, the craft-induced effects for any one setting of the potentiometer-controls will in general be eliminated in this way only when the tank gun 20 is in one predetermined angular position with reference to the longitudinal axis LA of the tank. For all other angular positions of the gun 20, there will be only partial and incomplete compensation for the induced effects. This results from the fact that with the earlier navigation apparatus there is the assumption that the effective magnetic-center of the craft remains in the same, or substantially the same, position. But the effective magnetic-center in the case of the tank changes considerably when the gun 20 is angularly displaced.

The devices 2 and 5 are provided to overcome, at least partially, this difficulty. The output signals of the devices 2 and 5 which like those of the devices 1, 3, 4 and 6, vary in accordance with changes in the effective magnetic-center of the tank, are fed via potentiometers 21 and 22 respectively to the difference amplifiers 15 and 13 respectively for subtraction from the output signals of the devices 3 and 6 respectively. The settings of the potentiometers 21 and 22 are made by means of respective manual controls 23.

In such a navigation apparatus the potentiometers 12 and 14 are set as previously described, when the gun 20 extends parallel to the longitudinal axis LA of the tank, i.e. in the position where the earth's magnetic field in the vicinity of the devices 1 to 6 is subjected to the greatest deviation by the gun. During this adjustment of the potentiometers 12 and 14, the potentiometers 21 and 22 are set to provide zero output. Thereafter the gun 20 is swung to a different position, say the position shown in FIG. 1, and the potentiometers 21 and 22 are then adjusted to provide output signals to the respective amplifiers 15 and 13. These signals modify the magnitudes of the output signals of the difference amplifiers 13 and 15 to compensate for any change in the position of the effective magnetic-center of the tank, and thereby eliminate from the relative values of the output signals of the difference amplifiers 13 and 15 the effects of the deviation of the earth's magnetic field by the tank.

When this has been completed the gun 20 is once again swung to the position where it extends parallel to the longitudinal axis LA of the tank and the potentiometers 12 and 14 are readjusted. The gun 20 is then swung again and the potentiometers 21 and 22 readjusted.

The alternate adjustment of the potentiometers 12 and 14 on the one hand, and the potentiometers 21 and 22 on the other hand, is continued until these potentiometers have been adjusted to give the best possible results. Although by such an arrangement it will usually not be possible entirely to eliminate from the output signals of the difference amplifiers 13 and 15 the errors resulting from changes in the effective magnetic-center of the tank when the gun 20 is swung, it has been found that this arrangement will reduce these errors to acceptable limits.

On completion of the adjustment of the potentiometers 12, 14, 21 and 22 it will usually be necessary to readjust the settings of the potentiometers 17 and 18 so that the magnitudes of the output signals of the potentiometers 17 and 18 are representative of $(G \cos \theta_m)$ and $(G \sin \theta_m)$.

The signals representative of the expressions (9) and (10), that is $(G \cos \theta_m)$ and $(G \sin \theta_m)$, are supplied to a unit 24 that effects correction for the local magnetic variation or grid variation (that is to say, for the local angular difference in azimuth between the magnetic and true meridians, or between the magnetic meridian and the grid lines). Within the unit 24, the signal representative of $(G \cos \theta_m)$ is supplied in a fixed proportion to an amplifier 25 via a potentiometer 26, and the signal representative of $(G \sin \theta_m)$ is supplied in the same fixed proportion to an amplifier 27 via a potentiometer 28. In addition, the signal representative of $(G \cos \theta_m)$ is supplied via the potentiometer 26 to the amplifier 27, and the signal representative of $(G \sin \theta_m)$ is supplied via the potentiometer 28 to the amplifier 25, both in the same selectively-variable proportion. The selectively-variable proportion, in this latter respect, is controlled by a common manual control 29 which is set in accordance with (tan M), where M is the appropriate angular value of the magnetic or grid variation. The two signals supplied to the amplifier 25 are combined additively therein to provide a sum proportional to:

$$\cos \theta_m - \sin \theta_m \tan M$$

so that the output signal from the amplifier 25 is representative of:

$$K \cos (\theta_m + M)$$

that is to say, of:

$$K \cos \theta \quad (11)$$

where: $\theta$ is the true heading of the vehicle; and

K is inversely proportional to (cos M). The two signals supplied to the amplifier 27, on the other hand, are combined therein to provide a sum proportional to:

$$\sin \theta_m + \cos \theta_m \tan M$$

so that the output signal from the amplifier 27 is representative of:

$$K \sin (\theta_m + M)$$

that is to say, of:

$$K \sin \theta \quad (12)$$

The two signals representative of expressions (11) and (12) are used to provide an indication of the true or grid heading-angle $\theta$ of the tank, and also indications of the distance travelled in terms of northings and eastings. An indication of the heading-angle $\theta$ is provided by a compass indicator 30 that is driven by a two-phase synchro torque receiver 31, the output signals of the amplifiers 25 and 27 being supplied to the synchro-receiver 31 via amplifiers 32 and 33 respectively. (If a very high degree of precision is required, the synchro-receiver 31 and the indicator 33 may be replaced by a synchro-resolver and an electrical zero-indicator responsive to any signal induced in the rotor winding of the resolver, the signals from the amplifiers 25 and 27 being supplied to the mutually-perpendicular stator windings of the resolver; the angular position of the rotor is set manually to obtain zero-signal induced in the rotor winding so that the angular setting of the rotor in these circumstances indicates the heading-angle).

The output signals of the amplifiers 25 and 27 are supplied to a distance computer 34 together with a signal which is representative of the forward velocity V of the vehicle. This latter signal is derived in the present instance by a pick-off 35 coupled to the transmission of the vehicle. The computer 34 in accordance with the three signals supplied to it, provides a digital indication of the appropriate northing on a digital indicator 36, and a digital indication of the appropriate easting on a digital indicator 37. The construction and operation of the computer 34 will now be described with reference to FIG. 4.

Referring to FIG. 4, the output signals of the amplifiers 25 and 27, representative respectively of expressions (11) and (12), are received in the computer 34 by input circuits 38 and 39. Each circuit 38 and 39 acts both as a phase detector and a rectifier to derive two output signals; a first of the output signals, being derived in dependence upon the phasing of the received signal, is representative of the sign of the relevant expression, and the second, being derived by a process involving rectification, is representative of the modulus of that expression.

The said first output signal of the circuit 38 is supplied to an integrator 40. The integrator 40 controls the digital indicator 36 in accordance with the integral with respect to time of the signal representative of forward speed V, this signal being supplied to the integrator 40 from the pick-off 35 via a switch 41. Each increment in the integration process is ascribed the sign represented by the said first output signal supplied from the circuit 38 to the integrator 40.

The said second output signal of the circuit 38 is supplied through a switch 42 to an integrator 43, and also to a summing amplifier 44 that controls operation of the switches 41 and 42. The amplifier 44 compares the signal it receives from the circuit 38 with the output signal of an integrator 45 that integrates with respect to time a predetermined constant voltage that is supplied within the integrator 45. When, with the passage of time, the output signal of the integrator 45 reaches equality with the signal received from the circuit 38, the output signal of the amplifier 44 falls to zero. This causes both switches 41 and 42 to open and thereby breaks the supply to the integrator 40 of the signal from the pick-off 35 and the supply to the integrator 43 of the second output signal of the circuit 38.

The two output signals of the circuit 39 are utilized in a similar manner to those of the circuit 38. The said first output signal of the circuit 39 is supplied to an integrator 46 to control the sign of each increment of an integration process performed by the integrator 46. The integrator 46 controls the digital indicator 37 in accordance with the integral with respect to time of the signal representative of forward speed V, this signal being supplied to the integrator 46 from the pick-off 35 via a switch 47. The said second output signal of the circuit 39 is supplied through a switch 48 to the integrator 43 and also to a summing amplifier 49 that controls operation of the switches 47 and 48. The amplifier 49 compares the signal it receives from the circuit 39 with the output signal of the integrator 45, and when there is equality between them its output signal falls to zero. This causes both switches 47 and 48 to open and thereby breaks the supply to the integrator 46 of the signal from the pick-off 35 and the supply to the integrator 43 of the second output signal of the circuit 39.

The output signal of the integrator 45, in addition to being supplied to the amplifiers 44 and 49, is supplied to the integrator 43 in opposition to the two signals supplied via the switches 42 and 48. The integrator 43 includes a voltage doubler for doubling the output signal of the integrator 45 before that signal is combined with the other two signals supplied to the integrator 43. Thus, after the two switches 42 and 48 have both opened, the integral with respect to time provided by the integrator 43 is reduced progressively to zero. A zero-detector 50 is responsive to the condition in which the integral of the integrator 43 becomes zero, to reset the integrator 45 to zero.

Whenever the integrator 45 is reset to zero, the switches 41, 42, 47, and 48 close under control of the amplifiers 44 and 49 to supply to the integrator 43 the signals representative of the moduli of expressions (11) and (12), and to supply to the integrators 40 and 46 the signal representative of the forward speed V. The switches 41 and 42 are maintained closed by the amplifier 44 until the integral provided by the integrator 45 reaches equality with the modulus of expression (11), that is, for a period of time proportional to (K cos $\theta$). Similarly, the switches 47 and 48 are maintained closed by the amplifier 49 until the integral provided by the integrator 45 reaches equality with the modulus of expression (12), that is, for a period of time proportional to (K sin $\theta$). The full integral accumulated by the integrator 43 in respect only of the two signals supplied through the switches 42 and 48 is therefore equivalent to:

$K^2 \cos^2\theta + K^2 \sin^2\theta$ that is to say, to $K^2$. When eventually the integral with respect to time of the output signal of the integrator 45 reaches $K^2$, the integral provided by the integrator 43 becomes zero. The response of the zero-detector 50 to this, resets the integrator 45 and accordingly initiates another integrating cycle in a series of such cycles.

Since the output signal of the integrator 45 increases progressively with time, the time taken for the integral of this output signal accumulated by the integrator 43 to reach $K^2$, is a measure of K. Each of the series of integrating cycles accordingly has a duration varying with K, and the switches 41 and 47, which are closed during each cycle for periods K cos $\theta$ and K sin $\theta$ respectively, are thereby closed intermittently throughout the series for periods totalling the fractions (cos $\theta$) and (sin $\theta$) respectively, of the total time. The integral of the signal representative of speed V accumulated by the integrator 40 accordingly provides a measure, sensibly independent of the variable K, of the integral with respect to time of expression (V cos $\theta$). The indicator 36 is updated in accordance with this integral and thereby provides the required indication of northing. Similarly, the integral accumulated by the integrator 46 provides a measure, sensibly independent of the variable K, of the integral with respect to time of expression (V sin $\theta$), and the indicator 37, up-dated in accordance with this provides the required indication of easting.

It is necessary with the computer of FIG. 4 to ensure that the integrator 45 is reset to zero rapidly. In order to meet this requirement it may be arranged that two capacitors are used for the integration process during alternate integration cycles. Furthermore, it is desirable to ensure that the integral of the integrator 43 is reduced to zero only after the switches 42 and 48 have both been opened. To this end, the output signal of the integrator 45 may be supplied to the integrator 43 via a potentiometer so as to modify the time-scale and reduce the rate of accumulation of the integral of this signal within the integrator 43. Additionally, it may be arranged that the integrator 45 is reset only in response to the combined circumstances in which the zero-detector 50 emits a signal and both the switches 42 and 48 are open.

In a modification of the computer shown in FIG. 4, the indicators 36 and 37 are driven mechanically by respective electrical stepping-motors that replace the integrators 40 and 46. The pick-off 35 in these circumstances supplies pulses at a recurrence rate representative of the forward velocity V, and these pulses supplied to either motor via the relevant switch 41 or 47 each cause the motor to rotate one step. The rotation is forward or backward in dependence upon the sign of the increment as represented by the said first signal from the appropriate input circuit 38 or 39.

The variation-correction unit 24, rather than having the form described with reference to FIG. 2, may simply involve a resolver having a pair of mutually-perpendicular rotor-windings that are rotatable with respect to a pair of mutually-perpendicular stator windings. In these circumstances the rotor of the resolver is set to an angular position with respect to the stator dependent upon the angle M, and the signals representative of (G cos $\theta_m$) and (G sin $\theta_m$) are supplied to the windings of one pair; the output signals of the unit 24 are then taken from the windings of the other pair.

The operation of the navigation apparatus described above with reference to FIG. 2 can be readily checked. For example, when the computer 34 of FIG. 4 is used, the operation of the major parts of the apparatus can be checked simply by injecting a signal in place of the signal from the pick-off 35, and by then varying the setting of the control 29 to enter this signal selectively into either integrator 40 or 46.

Although the navigation apparatus has been described with reference to tanks it is visualized that it is applicable to many other types of craft and, in particular, to cargo-carrying craft in which the cargo may include bodies of magnetic material that tend to change the position of the effective magnetic-center of the craft. In such a case the settings of the potentiometers 21 and 22 are initially set to their mid-positions and the potentiometers 12 and 14 are then set to provide the desired correction when the craft is empty. A dummy load of magnetic material is then placed in the craft at one end thereof and the potentiometers 21 and 22 adjusted to correct for any change in the position of the effective magnetic-center caused by the dummy load.

The flux-valve devices may be rigidly mounted on the boom 7 instead of being pendulously mounted on the boom 7. In such a case two pendulous or other tilt-sensing devices are provided to give an indication of the tilt of, on the one hand, the group of flux-valve devices constituted by the devices 1, 2 and 3 and, on the other hand, the group of flux-valve devices constituted by the devices 4, 5 and 6. The tilt-sensing devices are used to modify the combined output signals of the respective groups of flux-valve devices in dependence upon their angle of tilt.

Two booms may be provided for the flux-valve devices 1 to 6, the devices 1, 2 and 3 being mounted on one boom and the devices 4, 5 and 6 being mounted on the other boom. The devices 1, 2 and 3 are mounted so as to extend at an angle of 45° to the longitudinal axis LA of the craft while the devices 4, 5 and 6 are mounted so as to extend at right-angles to the devices 1, 2 and 3.

Each group of flux-valve devices may consist of more than three devices, the intermediate devices in each group of devices being used to compensate for changes in the effective magnetic-center of the craft.

I claim:

1. Navigation apparatus for use with a craft, comprising magnetic-detector devices spaced apart from one another for sensing the earth's magnetic field as subjected to deviation by the craft, the magnetic-detector devices sensing the magnitudes at more than two spaced locations of the component of deviated field acting parallel to a first of two mutually-inclined craft-axes, and the magnitudes at more than two spaced locations of the component of the deviated field acting parallel to a second of the two axes, means for deriving from the magnetic detector devices first signals in accordance with the respective said magnitudes of the component of deviated field acting parallel to the said first axis, means for deriving from the magnetic-detector devices second signals in accordance with the respective said magnitudes of the component of deviated field acting parallel to the said second axis, first circuit means responsive to the set of said first signals to provide an output representation in accordance with the component of undeviated field acting parallel to the said first axis, and second circuit means responsive to the set of said second signals to provide an output representation in accordance with the component of undeviated field acting parallel to the said second axis, said fist and second circuit means each comprising means for modifying more than one of the respective set of signals to modify the ratio to one another of those signals, and means responsive to the ratio-modified signals to derive the output representation of the respective said circuit means in accordance with difference between them.

2. Navigation apparatus according to claim 1, wherein the magnetic-detector devices comprise a first group of magnetic-detector devices for sensing the magnitudes of the component of deviated field acting parallel to the first axis at individual ones of the respective said spaced locations, and a second group of magnetic-detector devices for sensing the magnitudes of the component of deviated field acting parallel to the second axis at individual ones of the respective said spaced locations.

3. Navigation apparatus according to claim 2, including a non-ferromagnetic member, the magnetic-detector devices of each group thereof being carried by the member at spaced positions thereon.

4. Navigation apparatus according to claim 1, including means for providing a representation of magnetic heading of the craft in accordance with the output representations provided by said first and second circuit means.

5. Navigation apparatus according to claim 1, including speed-sensing means for providing a signal dependent upon velocity of the craft, and computing means responsive to this signal and the output representations provided by the first and second circuit means, to compute the distances travelled by the craft along earth-defined axes.

6. Navigation apparatus according to claim 1, including variation-correction means for deriving in accordance with the output representations provided by said first and second circuit means two signals dependent respectively upon said components of undeviated field corrected for local magnetic-variation or grid-variation.

7. Navigation apparatus according to claim 6, wherein said variation-correction means includes means for combining the output representations provided by said first and second circuit means in predetermined proportions.

8. Navigation apparatus according to claim 5, including variation-correction means responsive to said representations provided by said first and second circuit means for deriving two signals dependent respectively upon said components of undeviated magnetic field corrected for local magnetic-variation, and wherein said computing means comprises two integrators, two switches associated with the two integrators respectively, each said switch being selectively operable for supplying said signal dependent upon craft-velocity to its respectively-associated integrator, and timing means for operating the two switches for periods of time dependent respectively upon said signals derived by said variation-correction means.

9. Navigation apparatus according to claim 1, wherein said first and second axes are mutually-perpendicular axes.

10. Navigation apparatus according to claim 9, wherein said first and second axes are fore-aft and athwartships axes of the craft.

11. Navigation apparatus for use in a craft, comprising magnetic-detector devices spaced apart from one another for sensing the earth's magnetic field as subjected to deviation by the craft, the magnetic-detector devices sensing the magnitudes at at least two spaced locations of the component of deviated field acting parallel to a first of two mutually-inclined craft-axes, and the magnitudes at at least two spaced locations of the component of deviated field acting parallel to a second of the two craft-axes, means for deriving from the magnetic-detector devices first signals in accordance with the respective said magnitudes of the component of deviated field acting parallel to the said first axis, means for deriving from the magnetic-detector devices second signals in accordance with the respective said magnitudes of the component of deviated field acting parallel to the said second axis, means for sensing the earth's magnetic field as subjected to deviation by the craft to derive a representation in accordance with the position of the effective magnetic-center of the craft, means for responding to the said first signals and said representation to provide an output signal in accordance with the component of undeviated field acting parallel to the said first axis, and means for responding to the said second signals and said representation to provide an output signal in accordance with the component of undeviated field acting parallel to the said second axis.

12. Navigation apparatus according to claim 11, wherein the said means for providing the output signals each comprise means for modifying one of the respective first and second signals in accordance with said representation.

13. Navigation apparatus according to claim 12, wherein the said means for providing the output signals each include means for modifying the ratio to one another of the respective first and second signals, and means for deriving the respective output signal in accordance with difference between the respective ratio-modified signals.

14. Navigation apparatus according to claim 12, wherein the said representation comprises one signal for modifying the respective one of said first signals, and another signal for modifying the respective one of said second signals.

* * * * *

UNITED STATES PATENT OFFICE
CERTIFICATE OF CORRECTION

Patent No. 3,744,312              Dated  July 10, 1973

Inventor(s) EDWARD WILLIAM ANDERSON

It is certified that error appears in the above-identified patent and that said Letters Patent are hereby corrected as shown below:

Foreign Application Priority Data

June 5, 1970   Great Britain. . . . . . . . . . . . . .27151/70

Signed and sealed this 6th day of August 1974.

(SEAL)
Attest:

McCOY M. GIBSON, JR.            C. MARSHALL DANN
Attesting Officer               Commissioner of Patents